United States Patent Office 2,785,202
Patented Mar. 12, 1957

2,785,202

BASIC ETHERS OF SUBSTITUTED DIPHENYL-METHYLCARBINOLS

Herbert Arnold, Bielefeld, Norbert Brock, Wadersloh, and Engelbert Kühas, Gadderbaum, Germany, assignors to Asta-Werke A. G. Chemische Fabrik, Brackwede, Germany No Drawing. Application October 23, 1953, Serial No. 388,044

Claims priority, application Germany October 25, 1952

4 Claims. (Cl. 260—570)

The invention relates to basic ethers of substituted diphenyl methyl carbinols and to a method of preparing the same.

Basic ethers of diphenyl alkyl carbinols are known which have the general formula

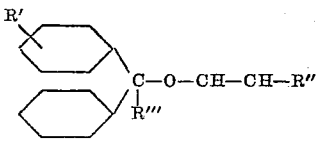

In this formula, R' represents a methyl group. R" stands for a morpholino radical and R''' is an alkyl radical (see C. A., vol. 45, pages 577 and 9521).

It is also known that such basic ethers of diphenyl alkyl carbinols possess antihistaminic properties.

We have found that certain new derivatives of this class of compounds display a surprisingly high antihistaminic effect, which by far exceeds the potency of the known compounds.

Said highly effective novel compounds are represented by the formula (1)

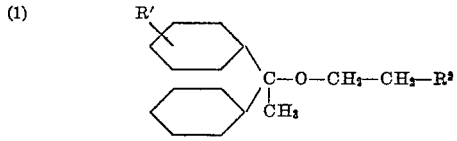

wherein R' is chlorine and R² a member of the group consisting of dimethylamine, diethylamine, and piperidyl radicals.

Said novel compounds can be prepared in a two stage process. For instance the [1(p-chlorophenyl)-1-phenyl]-ethyl-(β-dimethylaminoethyl) ether is prepared by reacting in a first stage: (a) either p-chloroacetophenone with phenyl-Mg-halide- or p-chlorobenzophenone with methyl-Mg-halide to (p-chlorophenyl)-phenyl methyl carbinol. In a second stage (b), said carbinol is then converted in the presence of NaNH₂ in toluene solution with β-dimethyl-aminoethylchloride into [1-(p-chlorophenyl)-1-phenyl]-ethyl-(β-dimethylaminoethyl)-ether.

These reactions are represented by the equations (a)

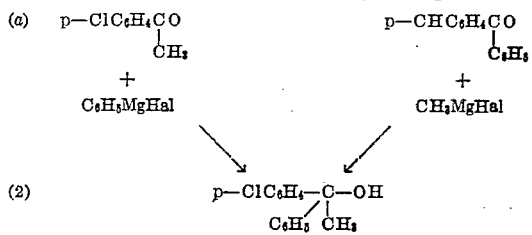

(b)

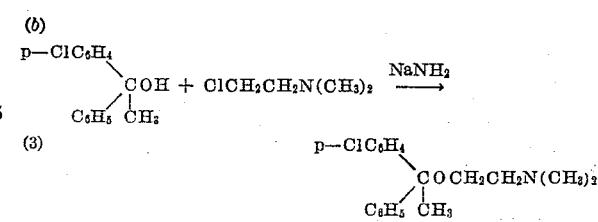

However, this two-stage process is unsatisfactory because it gives low yields. When the reactions were carried out with the conventional 16 to 20% excess of the Grignard reagent, the ether (3) was obtained in a yield of 40 percent in the p-chlorobenzophenone reaction, and in a yield of only 30 percent, when p-chloroacetophenone was used as starting material.

We found that these low yields were due to the fact that the carbinol obtained by the Grignard reaction contained still varying amounts of the unchanged starting ketone and that said ketone reacted with the NaNH₂ to form undesired by-products. These side-reactions are particularly harmful because the intermediate carbinol (2) is very unstable; it readily splits off water and forms the corresponding p-chlorodiphenylethylene. It is therefore impossible to purify the carbinol.

We have found that we can prevent the formation of undesirable by-products and increase about twofold the yield of basic ether by reacting in the first stage the starting compound, e. g. the p-chlorobenzophenone, with an excess of 50 percent or more of the Grignard reagent. Under these conditions, complete reaction takes place and the intermediate carbinol does no longer contain any starting ketone, which in the second stage could interfere with the main reaction between carbinol and basic alkyl-chloride and produce undesired by-products.

We have further found that methyl-Mg-chloride, which is readily obtained from methyl chloride and magnesium powder, can be employed with advantage as Grignard reagent; it is not necessary to use the expensive methyl-Mg-bromide or iodide, which heretofore were generally preferred because of their good reactivity. The ready applicability of methyl-Mg-chloride for the process of the invention presents a considerable advantage, which is of particular importance for the commercial manufacture of the novel compounds.

For the therapeutic application, the new ethers are preferably converted into suitable salts, of which the hydrochloric salts have proved to be particularly suitable. However, the preparation of the hydrochlorides meets with considerable difficulties, as the ethers are easily split by an excess of hydrochloric acid according to the following equation:

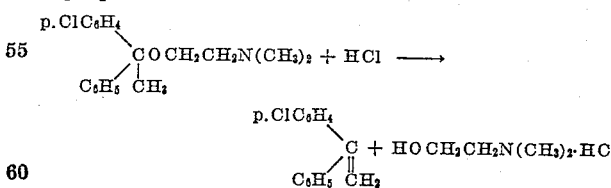

According to the invention, this difficulty is overcome by adding to the basic ether in ethereal solution dropwise the theoretical amount of an HCl-saturated ether with stirring. The precipitated hydrochloride, which in its crude state is very hygroscopic, can be rendered moisture resistant by drying in vacuo, dissolving in acetone, precipitating with dry ether, and subsequently again drying in vacuo over phosphorus pentoxide.

The following examples are given for illustrative purposes and are not intended to place any restrictions on the hereindescribed invention:

EXAMPLE 1

*(1 - (p - chlorophenyl) - 1 - phenyl) ethyl - (beta - dimethylaminoethyl) ether*

The Grignard solution is prepared by introducing methyl chloride into a boiling suspension of 36 g. of magnesium in 1000 cc. of absolute ether until all the magnesium has reacted. 216 g. of 4-chloro-benzophenone are slowly added to said Grignard solution with ice cooling and stirring; after 15 hours, the thus obtained product is poured into a mixture of 200 g. of ammonium chloride and ice, whereupon it is separated with ether. The separated ether layer is dried with sodium sulfate, and the ether is distilled. The residual carbinol is added to a suspension of 45 g. of sodium amide in 500 cc. of toluene. To the thus obtained mixture there are added 125 g. of dimethylaminoethyl chloride, and the mixture is heated at boiling temperature for 3 hours with stirring. The mixture is taken up with water and the base is extracted from the toluene with dilute hydrochloric acid. The hydrochloric solution is rendered alkaline with caustic soda, the base is separated with ether, dried, and after distillation of the ether fractionated in vacuo. $B_{0.05}$ 150–153° C. The basic ether is then dissolved in dry ether, and ether saturated with dry hydrogen chloride is added dropwise with stirring. An excess of hydrogen chloride must be avoided as it may produce decomposition to the corresponding diphenyl ethylene. The ether-moist hydrochloride is preferably dried at once in vacuo and subsequently re-precipitated from acetone-ether and then again dried in vacuo over phosphorus pentoxide.

Hydrochloride, m. 128° C.

EXAMPLE 2

*[1 - (p - chlorophenyl) - 1 - phenyl] - ethyl - (beta - dimethylamino ethyl) ether*

32 g. of magnesium and 130 g. of chlorobenzene are heated on the oil bath at boiling temperature until phenyl-Mg-chloride has been formed. The Grignard compound is then dissolved in 1000 cc. of absolute ether, and 155 g. of 4-chloro-acetophenone are added with stirring and ice-cooling. After 15 hours, a mixture of 200 g. of ammonium chloride with cracked ice is introduced, and the solution is separated with ether. The ether extract is dried with sodium sulfate, the ether is distilled, and the residual carbinol is condensed with diethylaminoethyl chloride as described in Example 1.

The obtained ether had a boiling point of 150–153° C. under 0.05 mm. mercury pressure.

EXAMPLE 3

*[1 - (p - chlorophenyl) - 1 - phenyl] - ethyl - (beta - diethylamino ethyl) ether*

(p-Chlorophenyl)-phenyl methyl carbinol is prepared either according to Example 1 by reacting 4-chloro-benzophenone with methyl-Mg-chloride or according to Example 2 by reacting 4-chloro-acetophenone with phenyl-Mg-chloride. The compound is then, as described in Example 1, condensed in toluene solution and in the presence of $NaNH_2$ with diethylamino ethyl chloride.

$B_{0.02}$ 142–147° C., hydrochloride, m. 138° C.

EXAMPLE 4

*[1 - (p - chlorophenyl) - 1 - phenyl] - ethyl - (beta-piperidino-ethyl) ether*

(p-Chlorophenyl)-phenyl methyl carbinol is prepared as described in Example 1 or 2 and then condensed with piperidino ethyl chloride in the manner set forth in Example 1.

$B_{0.05}$ 168–171° C.; hydrochloride, m. 175° C.

The novel ethers herein, prepared in accordance with the procedure described, are useful as intermediates in the preparation of derivatives of diphenyl methyl carbinols and are, themselves, highly effective antihistamines.

In pharmacological tests, which were made first with isolated organs (intestinal strips of guinea pigs) and subsequently on the living animal (histamine-aerosol), it was found that the antihistaminic potency of the new compounds had increased to an unexpected and surprising degree in comparison with the antihistaminic effectiveness of beta-dimethylaminoethyl benzhydryl ether. For instance, [1 - (p - chlorophenyl) - 1 - phenyl] - ethyl-(beta - dimethylamino ethyl) ether shows for the same toxicity an antihistaminic effectiveness, which exceeds the effectiveness of beta dimethylamino ethyl benzhydryl ether by more than twelve times. This compound is therefore a most potent antihistaminic agent and has a therapeutic index which is considerably improved over that of beta-dimethylamino ethyl benzhydryl ether. The beneficial effects of the new compounds have been confirmed by controlled clinical cases tested in several medical research centers.

The foregoing illustrates the practice of this invention; however, it is to be understood that it is not limited to the specific embodiments thereof except as defined in the appended claims.

We claim:

1. As new organic compounds, members of the group consisting of basic ethers of substituted diphenylmethylcarbinols having the general formula

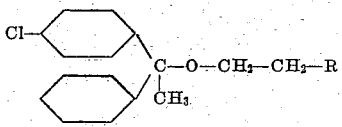

wherein R is a member of the group consisting of dimethylamino, diethylamino, and piperidyl radicals, and the pharmacologically acceptable acid addition salts of said ethers.

2. A method for preparing the hydrochlorides of basic ethers of substituted diphenylmethylcarbinols of the formula

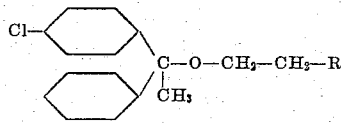

wherein R is a member of the group consisting of dimethylamino, diethylamino, and piperidyl radicals; comprising reacting first a ketone of the formula

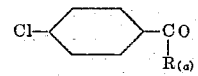

wherein $R_{(a)}$ is a member of the group consisting of methyl and phenyl, with an excess of at least about 50 percent of an organomagnesium halide of the formula $$R_{(a1)}MgHal$$

wherein Hal stands for halogen and $R_{(a1)}$ is a member of the group consisting of methyl and phenyl but not the same group as that used for $R_{(a)}$, under Grignard conditions to a carbinol of the formula

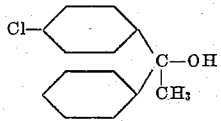

and subsequently reacting said carbinol in an organic solvent in the presence of sodium amide with a compound of the formula HalCH₂CH₂R wherein Hal and R have the above recited composition, separating the formed ether, dissolving the obtained basic ether in ethyl ether, adding to said solution, dropwise, ethyl ether saturated with hydrochloric acid in the amount calculated for the formation of the hydrochloride of said basic ether, drying said precipitated hydrochloride in vacuo, dissolving the hydrochloride in acetone, precipitating the hydrochloride with dry ethyl ether, removing the ethyl ether, and drying the obtained hydrochloride in vacuo over phosphorus pentoxide.

3. As a new organic compound, a member of the group consisting of beta-dimethylamino-ethyl (4-chloro-alpha-methyl-benzhydryl) ether, and the pharmacologically acceptable acid addition salts thereof.

4. Beta - dimethylamino - ethyl (4 - chloro - alpha-methyl - benzhydryl) ether hydrochloride.

References Cited in the file of this patent
UNITED STATES PATENTS

| | | |
|---|---|---|
| 2,430,586 | Ruthruff | Nov. 11, 1947 |
| 2,454,092 | Rieveschl | Nov. 16, 1948 |
| 2,527,963 | Rieveschl | Oct. 31, 1950 |

OTHER REFERENCES

Chem. Abstracts 45: 577, 9521 (1951).